Nov. 17, 1931.  R. SCHWAAR  1,831,972
MACHINE FOR FINISHING THE PALLETS OF WATCH MOVEMENTS
Filed April 28, 1930  2 Sheets-Sheet 1
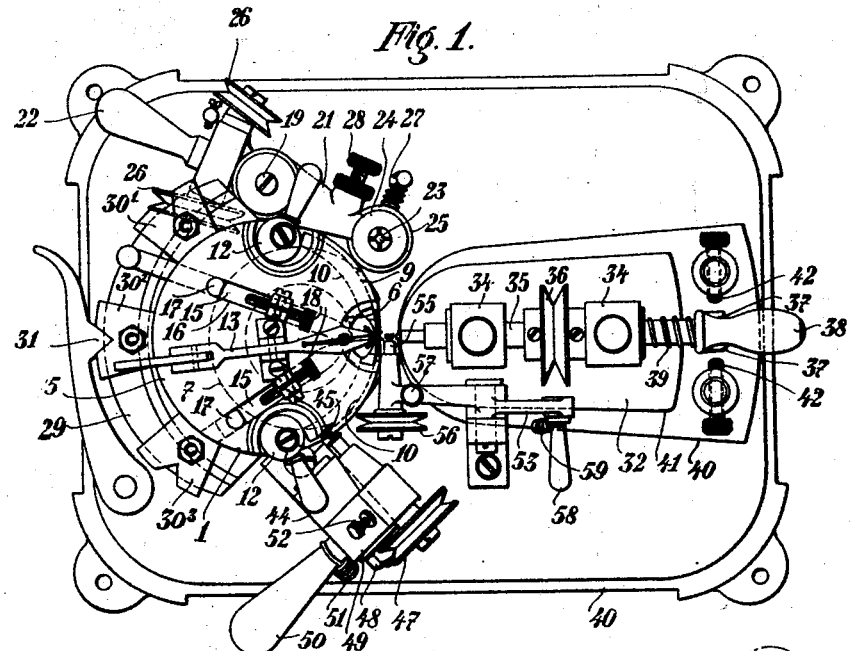
Fig. 1.
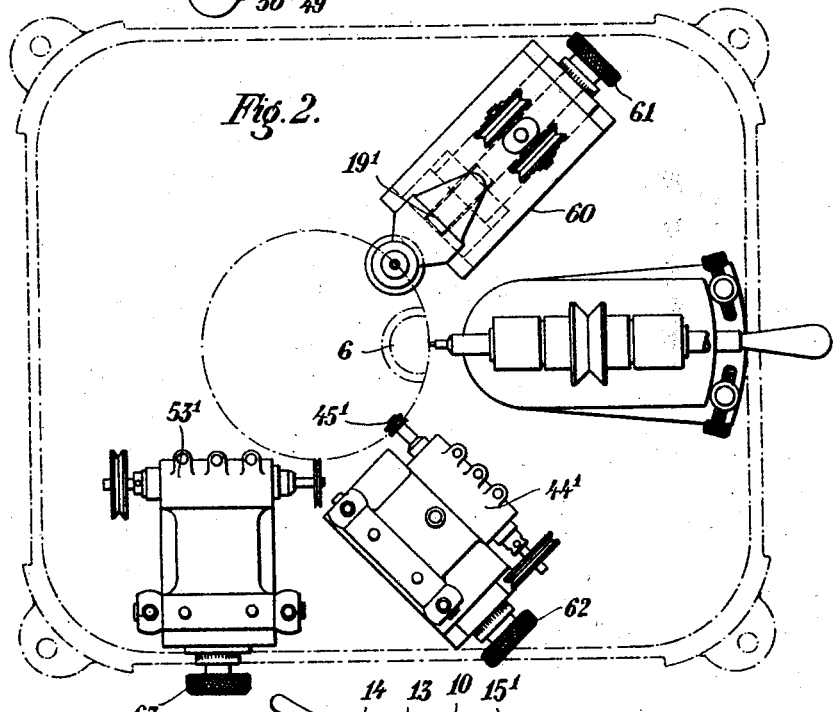
Fig. 2.
Fig. 7.
R. Schwaar
INVENTOR
By Marks Heller
ATTYS.

Nov. 17, 1931.  R. SCHWAAR  1,831,972
MACHINE FOR FINISHING THE PALLETS OF WATCH MOVEMENTS
Filed April 28, 1930  2 Sheets-Sheet 2
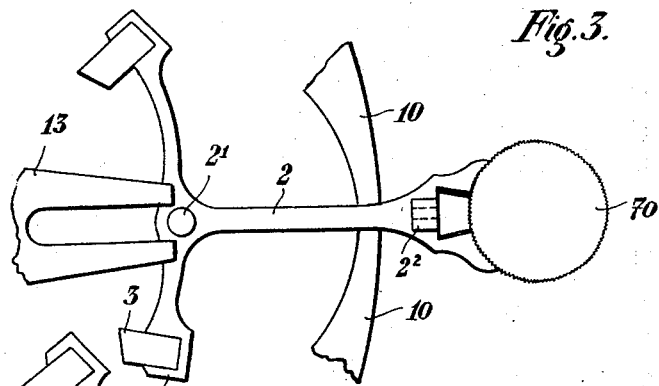
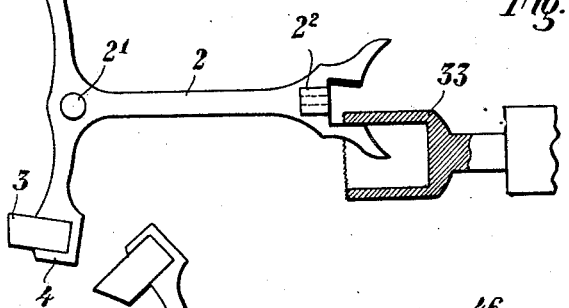
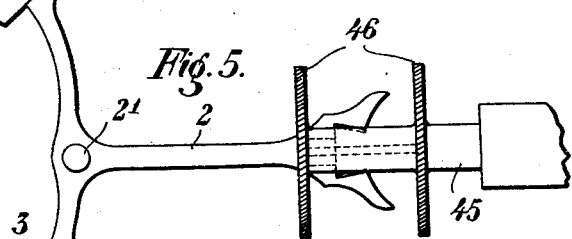
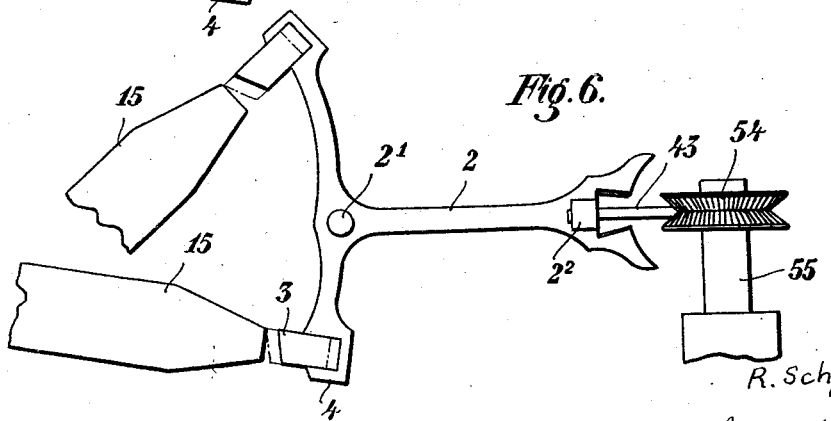

Patented Nov. 17, 1931

1,831,972

UNITED STATES PATENT OFFICE

RENÉ SCHWAAR, OF BIENNE, SWITZERLAND

MACHINE FOR FINISHING THE PALLETS OF WATCH MOVEMENTS

Application filed April 28, 1930, Serial No. 448,082, and in Switzerland May 4, 1929.

The present invention relates to a machine for finishing the pallets of watch movements. The invention comprises a rest for clamping the pallet and for presenting the same successively to working tools without changing the clamping.

The accompanying drawings represent two working examples of the invention.

Fig. 1 is a plan view of the general arrangement of the machine and Fig. 2 is a modified form of said arrangement.

Figs. 3–6 are enlarged detail views of the tools used and

Fig. 7 is a side elevation of a rotatable rest employed.

In the first example shown in Fig. 1 and 3 to 7 the rest 1 mounted on a base plate 40 is made rotatable and carries besides a clamping device for the pallet 2 two slidable members for adjusting the pallet stones 3 in their settings 4. The rest comprises an upper and a lower plate. The upper plate 5 has a curved cutting 6 clearing the space for clamping the pallet upon the lower plate 7 and is arranged eccentrically and is considerably larger than the under plate in order to afford the required space for the clamping device. The pallet 2 to be finished is provided (Fig. 6) with a pivot pin $2^1$, a holder $2^2$ for the safety pin 43 and with the pallet stones 3 inserted and sealed to their settings 4.

The clamping device must maintain above all the symmetrical axis of the pallet radially with regard to the rotable rest and so as to have the pallet-fork jutting out from the edge of the rest. To this end the lower plate 7 has near its edge a hole 8 (Fig. 7) receiving the pivot pin of the pallet—while the upper plate 5 has circular grooves 9 cut into its under side as guides for the slidable jaws 10 (Fig. 3). These jaws project into the cutting 6 and clamp the pallet close behind its forked portion. The clamp can be made tight by means of the adjustable eccentric disks 12. By these means the symmetrical axis of the pallet can be held exactly in line with the radius passing through the pivot of the rest and the hole 8. A clamping lever 13 swinging in a vertical sense keeps the pallet down on the plate by clutching the same with its split end on both sides of the spot where the pivot pin is fixed to the pallet (Fig. 3). An eccentric disc 14 provided with a handle and hinged to the hind end of the lever serves as means for tightening the clamp 13.

Besides this clamping device plate 5 carries also a device for adjusting the pallet stones 3 within their settings. This is done by means of slides 15 which are directed against the outer edges of the stones. The grooves guiding these slides are likewise cut into the underside of plate 5, but handles 17 serving as means for handling the said slides are extended through slots 16 to the upper outside of plate 5 and are limited in their way by stops in both directions. While the stop for one end position of the slide is a micrometric screw 18 held in a stationary lug of the plate the stop in the other direction is formed by the end of the slot 16.

Since the adjusting of the stones in their settings is only possible when the shellac used for sealing the stones to the settings has been softened, an electrical heating body $15^1$ enclosed by a box $15^2$ fitted into the lower plate 7 is provided for this purpose. This box takes the place of plate 7 which is encircled by the cutting 6 of plate 5. Therefore the pallet is held fast on the top wall of this box and the hole 8 is provided in this top wall, but also a separate and exchangeable plate could be provided for holding the pallet in position. The plate would be fixed by means of pilot pins and each different size of pallet would have its separate plate according to the different distance between the hole 8 and the edge of the plate. Before working the slides 15 the electric current is admitted through the wires $15^3$ until the shellac in the settings is sufficiently softened for allowing the stones to be moved.

The tool holders and the corresponding pawls are arranged all around the rest 1. However if a reciprocating slide has been substituted for the rotatable rest the tool holders are arranged side by side. The tool holders in their order of succession are the following:

The tool holder 19 for finishing the outer curved edge 20 of the horns of the fork is provided at the one end of a lever 21 which may be oscillated in a horizontal plane on a standard. The other end of this lever is shaped like a handle and the axis of the lever stands vertical. The holder itself is a jaw chuck 23 with a nut 24 and is rotated by means of a horizontal sheave 25 and the two guide sheaves 26. A traction spring 27 attached to a stationary pin tends to withdraw the holder from the rest and an adjustable screw 28 is adapted to limit the working position of the cylindrical cutter. The rest is then turned so that the symmetrical axis of the pallet intersects the vertical axis of the circular grinding wheel 70. In order to put the rest very quickly into its working position also for the other tool holders a corresponding number of notched segments $30^1$ $30^2$ $30^3$ are adjustably mounted on a segmental plate 7 bolted fast to the lower plate 29 and by means of a horizontally movable pawl 31 fitting said notches and provided with a handle the rest may be easily set. Notch $30^1$ has been designed for the tool holder 19.

The tool holder 32 for finishing the inner edges of the notch of the fork has a horizontal rotatable axis which is set in line with the symmetrical axis of the pallet by means of the pawl 31. The tool a hollow circular grinding wheel 33, is mounted at the end of a spindle 35 provided with a sheave 36 and with check faces 37 and mounted rotatably and slidably in the bearings 34. A pressure spring 39 tends to withdraw the tool holder from the rest so as to bring the hub of the sheave in contact with a bearing 34. The spindle can also be swung horizontally into two end positions corresponding with the convergency of the inner edges of the notch of the fork. To this end the head stock 41 is pivoted on the base plate 40 so as to be swung between the two stops 42 and the check-faces 37. The exact working position of the tool is obtained by pushing the spindle with the handle 38 until the sheave touches the forward bearing while one of the faces is held in contact with a stop 42.

The further workings of the pallet relates to the safety pin 43 of the pallet which has to be removed before the working of the fork. Therefore after having turned the rest into a suitable position this pin is put into its holder 22.

The tool holder 44 for cutting the pin to a certain length has two circular saw blades 46 set on a spindle 45 at a distance from each other corresponding to the length of the pin. This spindle 45 carries also a sheave 47 and is held at one end of a lever 49 pivoted on a horizontal axis 48. The other end of the lever is provided with a handle 50 attached by means of a tension spring 51 to the plate 40. This spring tends to withdraw the tool holder from the rest.

The exact setting of the tool holder is effected by means of the handle 50 and an adjustable stop 52 which limits the path travelled by the saw blades 46. This stop is adjusted so that, when the rest is turned to bring the pallet right before this tool holder the saw blades of this latter when swung completely down will have finished the trimming of the safety pin.

The tool holder 53 is intended for removing the bur left by the sawing at the end of the pin extended to the outside of the fork. It consists in a circular cutter 54 having a V shaped cross section. The arrangement of the spindle 55, the sheave 56, the stop 57, the handle 58 and the spring 59 of this holder is alike that of the spindle 45 and needs no special description.

In the second working example according to the Fig. 2 the general distribution of the tool holders and of the adjusting pawl with notches is the same as in the first example. Only the arrangement of the tool holders for working the curved edge of the fork and for cutting and finishing the pin is different, while the tool holder for finishing the inner edges of the notch of the fork remains unchanged.

Instead of being pivoted horizontally the toolholder $19^1$ is arranged as a horizontal slide 60 which may be adjusted with regard to the rotatable rest 1 by means of a screw 61.

The holder $44^1$ with the saw blades $45^1$ for cutting the safety pin is arranged pivotable in a vertical plane. When swung down it assumes a radial position with regard to the rotatable rest. This tool holder is mounted on a horizontal slide which can be moved by means of a screw 62.

The tool holder $53^1$ is arranged in a similar way except that the tool spindle is arranged perpendicularly on the symmetrical axis of the pallet set in position. The adjustment in a radial sense with respect to the rest is given here by means of the screw 63.

What I claim as new is:

1. In a machine for finishing the pallets of watch movements and in combination, a rotatable rest having a rotatable lower plate with a hole arranged for the pivot pin of the pallet and located at such a distance from the edge of the plate that the fork of the pallet will jut out from said edge, and an upper plate fixed to the lower and provided with a cutting encircling the space required by the pallet, a clamping device comprising a vertically pivoted clamping lever mounted on the upper plate said lever having a split curved fore end for clutching the pallet at its pivot portion and a lever with eccentric disk hinged to the hind end as tightening means of the clamp, said clamping device comprising also two curved jaws adapted to clamp the pallet stem laterally and guided within grooves provided in the under side of the upper plate and an eccentric disk having handles positioned so as to be used as tightening means for said jaws.

2. In a machine for finishing the pallets of watch movements and in combination a rotatable rest having a rotatable lower plate with a hole arranged for the pivot of the pallet, and located at such a distance from the edge of the plate that the fork of the pallet will jut out from said edge, and an upper plate fixed to the lower and provided with a cutting encircling the space required by the pallet, a clamping device comprising a vertically pivoted clamping lever mounted on the upper plate said lever having a split curved fore end for clutching the pallet at its pivot portion and a lever with eccentric disk hinged to the hind end as tightening means of the clamp, said clamping device comprising also two curved jaws adapted to clamp the pallet stem laterally and guided within grooves provided in the under side of the upper plate and an eccentric disk having handles positioned so as to be used as tightening means for said jaws, and a device for softening the sealing of the pallet stones comprising an electric heating body enclosed in a chamber of the lower plate beneath the fixing place of the pallet.

3. In a machine for finishing the pallets of watch movements and in combination a rotatable rest having a rotatable lower plate and an upper plate fixed to the lower plate and provided with a cutting encircling the space required by the pallet, a clamping device adapted to hold the pallet fast within said cutting, and an exchangeable plate fitted into the lower plate inside of said cutting and provided with a hole for the pivot pin of the pallet at such a distance from the edge of the plate that the fork of the pallet will jut out from said edge.

4. In a machine for finishing the pallets of watch movements and in combination, a rotatable rest having a rotatable lower plate with a hole arranged for the pivot pin of the pallet and located at such a distance from the edge of the plate that the fork of the pallet will jut out from said edge, and an upper plate fixed to the lower and provided with a cutting encircling the space required by the pallet, a clamping device comprising a vertically pivoted clamping lever mounted on the upper plate said lever having a split curved fore end for clutching the pallet at its pivot portion and a lever with eccentric disk hinged to the hind end as tightening means of the clamp, said clamping device comprising also two curved jaws adapted to clamp the pallet stem laterally and guided within grooves provided in the under side of the upper plate and an eccentric disk having handles positioned so as to be used as tightening means for said jaws, and a device for adjusting the pallet stones in their settings comprising slides guided in grooves between the upper and under plate and directed against the outer edges of the stones, handles integral with said slides projecting through slots in the upper plate and adjustable stops for limiting the path of the handles and slides.

5. In a machine for finishing the pallets of watch movements and in combination a rotatable rest having a rotatable lower plate with a hole arranged for the pivot pin of the pallet and located at such a distance from the edge of the plate that the fork of the pallet will jut out from said edge, and an upper plate fixed to the lower and provided with a cutting encircling the space required by the pallet, a clamping device comprising a vertically pivoted clamping lever mounted on the upper plate said lever having a split curved fore end for clutching the pallet at its pivot portion and a lever with eccentric disk hinged to the hind end as tightening means of the clamp, said clamping device comprising also two curved jaws adapted to clamp the pallet stem laterally and guided within grooves provided in the under side of the upper plate and an eccentric disk having handles positioned so as to be used as tightening means for said jaws, and a tool holder for finishing the inner edge of the notch of the fork comprising a horizontal spindle carrying a hollow cylindrical cutter and arranged rotatably and slidably in the same vertical plane with the spindle horizontally according to the convergency of the inner edges of the notch of the fork, stops for limiting this pivoting movement and a sheave fast to said spindle as driving means of the tool holder.

6. In a machine for finishing the pallets of watch movements and in combination, a rotatable rest having a rotatable lower plate with a hole ready to receive the pivot pin of the pallet and located at such a distance from the edge of the plate that the fork of the pallet will jut out from said edge, and an upper plate fixed to the lower and provided with a cutting encircling the space required by the pallet, a clamping device comprising a vertically pivoted clamping lever mounted on the upper plate said lever having a split curved fore end for clutching the pallet at its pivot portion and a lever with eccentric disk hinged to the hind end as tightening means of the clamp, said clamping device comprising also two curved jaws adapted to clamp the pallet stem laterally and guided within grooves provided in the under side of the upper plate and an eccentric disk having handles positioned so as to be used as tightening means for said jaws, a tool holder for finishing the outer curved ends of the horns of the fork comprising a stationary standard, a lever pivoted on said standard in a horizontal direction; a spindle mounted at one end of said lever and carrying a cylindrical cutter wheel and a sheave, a handle provided at the other end and an adjustable stop associated with the lever and adapted to determine the final position of the finishing tool.

In testimony whereof I affix my signature.

RENÉ SCHWAAR.